United States Patent [19]
Noji

[11] 3,909,842
[45] Sept. 30, 1975

[54] ACOUSTIC WARNING APPARATUS FOR VEHICLE
[75] Inventor: Akio Noji, Tokyo, Japan
[73] Assignee: Honda Giken Kogyo Kabushiki Kaisha, Tokyo, Japan
[22] Filed: Feb. 4, 1974
[21] Appl. No.: 439,614

[52] U.S. Cl. ............. 360/12; 179/100.1 C; 340/221
[51] Int. Cl. ............................................ G08b 19/00
[58] Field of Search ..... 360/12; 179/100.1 C, 1 VE; 340/221

[56] References Cited
UNITED STATES PATENTS
| | | | |
|---|---|---|---|
| 3,015,702 | 1/1962 | Vogel et al. | 360/12 |
| 3,582,949 | 6/1971 | Forst | 360/12 |
| 3,798,672 | 3/1974 | Gregg, Jr. | 360/12 |

Primary Examiner—James W. Moffitt
Attorney, Agent, or Firm—Haseltine, Lake & Waters

[57] ABSTRACT

An acoustic warning apparatus for a vehicle comprising a detecting device for detecting the occurrence of an abnormal condition at any of a plurality of checking points in a vehicle, a warning device for giving a warning as to the occurring of an abnormal condition by an appropriate colloquial speech recording by automatically selecting, simultaneously with the occurrence of the abnormal condition, a track channel on a tape that corresponds to the abnormal condition and reproducing the same, a warning stop for interrupting the warning and a warning stop release for operating the foregoing warning device again from the beginning, after the warning is once stopped, by means of an engine ignition switch or otherwise.

9 Claims, 1 Drawing Figure

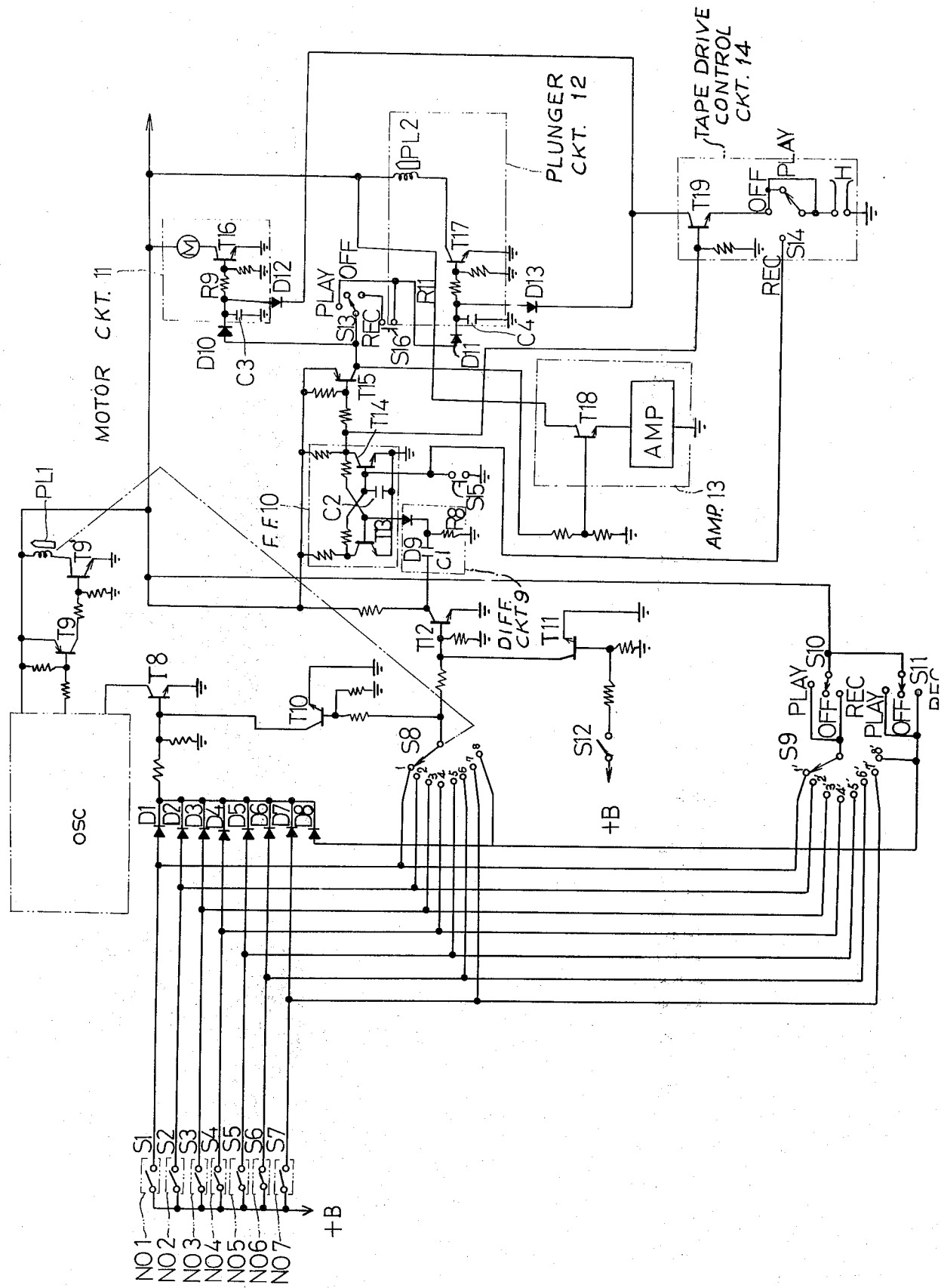

ACOUSTIC WARNING APPARATUS FOR VEHICLE

FIELD OF INVENTION

This invention relates to an acoustic type warning apparatus for a vehicle such as a motorcar.

SUMMARY OF INVENTION

The invention is characterized in that there is provided a warning means such that a warning of the occurrence of an abnormal condition at any checking point in a vehicle is given in an apt colloquial speech and repeat warning means is provided which is operable by an engine ignition switch so that when, after the engine is stopped and if the abnormal situation remains uncured, the same warning is repeated.

The invention is further characterized in that when, for instance, the driver stops the above-mentioned warning operation and the abnormal condition is not taken care of and he, thereafter, tries to drive by turning on the engine ignition switch, the above warning is given again. The driver is thereby reminded that he has not taken care of the abnormal condition at the check point yet. Thus, reliability of warning is assured and the safety of the vehicle is perfected.

More particularly, there is provided in accordance with the invention, an acoustic warning apparatus adapted for giving audible warnings corresponding to respective of a plurality of abnormal conditions which may take in a vehicle, said apparatus comprising detecting means for independently detecting each of said abnormal conditions when they occur, a record means having recorded thereon a plurality of signals corresponding to said warnings, said signals being adapted for being read as respective audible warnings, transducer and driving means for reading one of said signals at a time, and control circuit means responsive to said detector means for selecting the appropriate signal to be read and for actuating said transducer and driving means.

The apparatus of the invention may furthermore comprise warning stop means for interrupting the reading of a signal and warning stop release means adapted for overriding said warning stop means and enabling a signal to be read.

According to a feature of the invention, the warning stop release means include an ignition switch for said vehicle and a circuit operated by said switch to enable the reading of the latter said signal.

According to a further feature of the invention, the transducing and driving means includes an amplifier means for amplifying the signal which is read and a motor circuit means for driving the record means, said warning stop means including a switch coupled to said amplifier means for deactivating the same, said motor circuit means being independent of the warning stop means to drive the record means through a cycle so that it is prepared to operate anew upon the next operation of the detecting means.

According to still a further feature of the invention, the recording means may include a magnetic tape and the transducer and driving circuit includes a magnetic head for scanning said tape and moving means for incrementally moving the head transversely of the tape track by track, said control circuit means including an oscillator means and first transistor means coupling the oscillator means selectively to the moving means.

Advantageously the invention further provides means for recording a further signal on the tape whereby a selected signal or reminder can be recorded by the driver or operator of the vehicle.

According to a more specific version of the invention, there is provided a detecting means which includes a plurality of sensing switches, said control circuit means including a multiple contact switch mechanically coupled to said moving means, second transistor means coupled to said oscillator to actuate the same, the contents of said multiple contact switch being coupled and parallel to said sensing switches, and a third transistor means coupled to said multiple contact switch and to said second transistor means. Said second transistor means actuates the oscillator means when one of the sensing switches is actuated and until the multiple contact switch is adjusted by the moving means to the contact corresponding to the actuated sensing switch at which time the third transistor means deactivates the second transistor means and stops the moving means.

According to a further feature of the invention, the control circuit means includes a flip flop and there is provided a fourth transistor means coupling said multiple contact switch to the flip flop whereby the flip flop is operated by the latter. This flip flop is coupled to and controls the motor circuit means.

According to still a further feature of the invention, a capstan means is provided for engaging and driving the tape and is coupled to and controlled by the aforesaid flip flop. Moreover, the motor circuit means may include a timing circuit means to drive the motor circuit means for a predetermined period of time.

Other objects, features and advantages of the invention will be found in the detailed description which follows hereinafter.

BRIEF DESCRIPTION OF DRAWING

The invention will next be explained with reference to one embodiment thereof as illustrated in the accompanying drawing in which the sole FIGURE is a schematic diagram of a warning system of the invention.

DETAILED DESCRIPTION

Referring to the drawing, elements S1, S2, S3, S4, S5, S6, S7 are detecting means comprising detecting switches provided at respective checking points No. 1, No. 2, No. 3, No. 4, No. 5, No. 6, No. 7. These checking points are points, positions, locations, zones, areas, operations, parameters and the like which are required to be checked. They include, for example, detecting whether or not a seat safety belt is being used, detecting gasoline level, detecting running speed, detecting oil pressure, detecting the temperature level of cooling water and so on in the case of a motorcar. These detecting means are so arranged that when any checking point reaches an abnormal condition, the corresponding detecting means detects it and the corresponding switch becomes ON, whereby there is obtained an operation signal for the warning apparatus.

Element S8 is a channel change-over rotary switch arranged to be operated by a channel change-over (magnetic head shift) plunger, which will be mentioned hereinafter. It comprises change-over stationary contacts 1 - 8 corresponding, for example, to respective of the 1st to 8th channels on a tape. Element S9 is a channel change-over rotary operation switch comprising change-over stationary contacts 1' – 8'.

The foregoing detecting means S1 – S7 and the stationary contacts 1' – 7' of the stationary contacts 1' – 8' of the rotary operation switch S9 are connected in parallel with each other to the corresponding stationary contacts 1 – 7 of the contacts 1 – 8 of the channel change-over rotary S8. The stationary contact 8' of the channel change-over rotary operation switch S9 is independently connected to the stationary contact 8 of the channel change-over rotary switch S8.

Additionally, the switch S8 is connected to a recording and playback circuit mentioned hereinafter, while the switch S9 is connected to an electric source through three stationary contacts playback (PLAY), recording (REC) and (OFF). The stationary contact 8' of the stationary contacts of the switch S9 corresponding to the 8th channel is also connected to the electric source through its own switch S11 having three change-over contacts (PLAY), (REC) and (OFF).

Element PL1 is a head change-over plunger arranged to move in conjunction with the foregoing channel change-over rotary switch S8. Circuit (OSC) is an oscillation circuit for the operation thereof. Elements T9 and T9' are plunger control transistors. Element T8 is a transistor for the control of the oscillation circuit (OSC), that is, for control of the operation circuit for the plunger PL1. The stationary contacts 1 – 8 of the channel change-over rotary switch S8 and the stationary contacts 1' – 8' of the channel change-over rotary operation switch S9 are connected to the base terminal of the plunger operation circuit control transistor T8 through respective diodes D1 – D8.

The channel change-over rotary operation switch S9 and the change-over switches S10 and S11 are switches for supplying electric power from the electric source to the stationary contacts 1 – 8 of the channel change-over rotary switch S8 and the operation circuit for the head change-over plunger PL1. They serve as follows: Separately from the case caused by the operation of the foregoing detecting means S1 – S7, the operation of the channel change-over plunger PL1 and the operation of the recording and playback circuit can be obtained, whereby it becomes possible that respective warning communications corresponding to the checking points No. 1 – 7 are at will recorded on and reproduced from the 1st to the 7th channels on the tape. The 8th channel on the tape is provided separately of the abnormal condition detecting warnings and is to be used as a recording and playback channel for memoranda for the driver. For this, the recording and playback circuit is independently operated by the operation of the switch S11.

Element T10 is a transistor for control of the transistor T8 which can be operated by the rotary switch S8. The collector terminal thereof is connected to the base terminal of the transistor T8 and the emitter terminal thereof is connected to ground.

Element T12 is a transistor which is connected at its base terminal to the rotary switch S8 so as to be operated when the rotary switch S8 is connected to the stationary contact of the objective channel. Element T11 is a transistor for control of the transistor T12. Element S12 is an engine ignition switch interposed in a circuit connected between the base terminal of the transistor T11 and the electric source +B.

Circuit 9 is a differential circuit comprising a condenser $C_1$, a resistor R8 and a diode D9. Circuit 9 is connected to the collector terminal of the transistor T12. Circuit 10 is a flip flop circuit (FF circuit) comprising transistors T13, T14 and a condenser $C_2$. The differential circuit 9 is connected to the base terminal of transistor T13. T15 is a transistor the operation of which is to be controlled by the FF circuit 10. A motor circuit 11, a pinch roller operation plunger circuit 12 and an amplifier (AMP) circuit 13 are connected in parallel one with another to the collector terminal of the transistor T15.

In greater detail, T16 is a transistor for control of a tape driving motor M. The base terminal of the transistor T16 is connected to the collector terminal of the transistor T15 through a diode D10. T17 is a transistor for control of a plunger PL2 for moving a pinch roll so as to be in contact with or spaced from a capstan. Transistor T17 is connected to the collector terminal of the transistor T15 in parallel with transistor T16 for the motor circuit 11, through a diode D11 and a switch S13 having a playback stationary contact (PLAY), a recording stationary contact (REC) carrying a switch S16 and an off stationary contact (OFF).

T18 is a transistor for control of an amplifier (AMP). Transistor T18 is connected at its base terminal to the collector terminal of the transistor T15 in parallel with the transistors T16 and T17 of the motor circuit 11 and the plunger circuit 12.

Elements $C_3$ and R9 are respectively a condenser and a resistor constituting a time constant circuit for the control of transistor T16 for the motor circuit 11. Elements $C_4$ and R11 are respectively a condenser and a resistor constituting a time constant circuit for the control of transistor T17 for the plunger circuit 12. These time constant circuits are each designed to provide a time constant such that the motor M and the plunger PL2 are operated for a period of time sufficiently to reproduce one track channel of the tape.

Circuit 14 is a control circuit for a tape driving circuit comprising the motor circuit 11 and the plunger circuit 12 and including a detecting head H operable for sensing. To be more specific, T19 is a transistor for the control of the operations of the motor control transistor T16 and the plunger control transistor T17. The base terminals of the transistors T16 and T17 are connected to the collector terminal of the transistor T19 through respective diode D12 and D13. The emitter terminal of the transistor T19 is connected to the detecting head H through a switch S14 having a playback stationary contact (PLAY), a recording stationary contact (REC) which is connected to the base terminal of the transistor T14 of the FF circuit 10, and an off stationary contact (OFF).

Switch S15 is a warning stop switch connected at one end to the ground. Switch S15 is connected at its other end to the base terminal of the transistor T14 of the FF circuit 10 for limiting the operation of the transistor T15 for control of the operation of the recording and playback circuits 11, 123 and 13. If this switch S15 is turned ON, the operation of the FF circuit 10 is switched (transistor T14 is off and transistor 13 is on) whereby the transistor T15 is turned OFF and accordingly all of the circuits 11, 12 and 13 are turned OFF.

The switches S10, S13 and S14 are ganged together. The switches S11, S13, S14 are also ganged together. By changing-over them to their respective corresponding stationary contacts, separately from operation of the warning apparatus by the operation of the detecting means S1 – S7, the playback and recording circuits 11, 12 and 13 can be operated, whereby it becomes possible that warning speeches can be recorded on and reproduced from each of the 1st to the 7th channels on the tape and a memorandum for the driver can be recorded on and reproduced from the 8th channel.

The switch S16 is arranged to serve such that when each switch is turned to the recording stationary contact (through the amplifier circuit 13 is operated), the current flow to each of the circuits 11 and 12 for tape driving is cut off, whereby it is prevented that recording can be immediately started. Only when the operator turned the switch S16 ON, can each of the circuits 11 and 12 for tape driving be started to operate to bring about the recording starting condition.

The apparatus is such that when there occurs an abnormal condition at any of the checking points No. 1 – 7 in a vehicle, the detecting means S1 – S7 provided for the checking points No. 1 – 7 detect the abnormal condition. Due to the appropriate detection signal, the corresponding circuit begins to operate and the corresponding channel on the tape is reproduced. Thereby, a warning of the occurrence of the abnormal condition is given to the driver in colloquial speech. In this case, the actual measures to be taken can also be instructed properly thereby.

Specifically, the driver is informed of an actual abnormal condition by a spoken warning such as "gasoline level is low", "cooling water is overheated", "headlamp is on" and so on. At the same time, he is also informed of the actual measures to be taken, so that the driver, on hearing such warning, can know immediately the portion of the vehicle to be taken care of and thus correct measures can be promptly taken.

The actual operation will be explained with reference to the drawing:

It is now assumed that the cooling water of the checking point No. 2 is overheated and thereby the detecting means S2 is turned ON. The resultant detecting signal is applied to the base terminal of the transistor T8 through the diode D2, whereby the transistor T8 is turned ON. Due to the ON condition of the transistor T8, the oscillation circuit (OSC) is operated and the transistors T9 and T9' are turned ON. Consequently, the plunger PL1 is operated.

The plunger PL1 is repeatedly operated during the operation of the oscillation circuit (OSC). By one reciprocating motion thereof, the head is shifted by one channel and, at the same time, the channel change-over rotary switch S8 is changed over from the 1st channel stationary contact 1 to the 2nd channel stationary contact 2.

If the switch S8 is changed over to the stationary contact 2, the detecting signal is applied to the base terminal of the transistor T10 through the stationary contact 2 and the switch S8 whereby the transistor T10 is turned ON.

Due to the ON condition of the transistor T10, the transistor T8 cannot obtain the predetermined operation signal and turns OFF. Accordingly, the oscillation circuit (OSC), the transistors T9, T9' and the plunger PL1 are all turned OFF.

As a result, the 2nd channel on the tape corresponding to the detecting means S2 for the checking point No. 2 is selected and the tape is reproduced along the 2nd channel in which a specific warning has been recorded.

When the channel change-over switch S8 comes into contact with the stationary contact 2 of the 2nd channel, the detecting signal is also applied to the base terminal of the transistor T12 and thereby the transistor T12 is turned ON. Due to the ON condition of the transistor T12, the transistor T13 cannot obtain the predetermined operation signal and the FF circuit 10 is switched whereby the transistor T14 is turned ON and the transistor T13 is turned OFF. Thereby, the transistor T15 is turned ON.

Due to the ON condition of the transistor T15, the output of the transistor T15 causes the transistor T18, for operating the amplifier (AMP) to be turned ON. At the same time, the condensers C3 and C4 in the motor circuit 11 and the plunger circuit 12, respectively, are charged. By the charging thereof, the motor control transistor T16 and the plunger control transistor T17 are turned ON. Thereby, the motor M is operated and the pinch roller is brought into contact with the capstan, whereby the tape drive is started. In this way, all of the circuits 11, 12 and 13 are turned ON and the track channel, on the tape, corresponding to the detecting means S2 for the checking point No. 2 is reproduced. Thereby, the special communication recorded thereon, for example, a warning to the effect that the gasoline level is low is reproduced and additionally the measures for correcting the same are given audible.

When termination is detected at the detecting head H when the playback of the 2nd channel is finished and the tape ran through once, the transistor T19 is turned ON and the transistor T15 is turned OFF. Consequently, the amplifier circuit 13 is turned OFF and the condensers C3 and C4 are discharged through the diodes D12 and D13. The transistor T19 and thereby the transistors T16 and T17 are turned OFF whereby the motor M and the plunger PL2 are made inoperative and the tape drive is stopped.

According to the invention, there is also provided a warning stop means such that the warning can be stopped at will in the course of such warning. Also there is provided a warning stop release means. Thus, the drive can stop, as occasion demands, the foregoing warning in the midst thereof by pushing the stop switch S15.

In this case, the voice is stopped at the same time as the turning ON of the stop switch S15. However, in any event, the tape is surely stopped at the sensing of the end of the tape recording so as to be prepared for the next playback operation. Also, due to the ON condition of the engine ignition switch S12, the same channel is again reproduced from its beginning so as to give the same warning unless the problem is cleared up.

In greater detail, due to the ON condition of the stop switch S15, the transistor T14 of the FF circuit 10 is connected at its base terminal to ground so as to be made inoperative. Thereby, the transistor T13 is turned ON. Accordingly, T15 is turned OFF and the current flow to the motor circuit 11, the plunger circuit 12 and the amplifier circuit 13 is cut off. Consequently, the amplifier (AMP) is immediately stopped. However, the motor control transistor T16 and the transistor T17 for the control of the plunger for the pinch roller are kept in their operating conditions by the time delay determined by the condensers C3 and C4 and the resistors R9 and R11 (the time constant of which is of a value sufficient to reproduce one channel of the tape). The tape feeding is continued until the tape is turned once and the sensing of the terminal point (i.e., by a cue such as a metal strip or the like) reaches the detecting head H. Due to this sensing by the detecting head H, the transistor T19 is operated and consequently the transistors T16 and T17 are connected to ground at their base terminals through the diodes D12 and D13, and the condensers C5 and C4 are all discharged.

Accordingly, the transistors T16 and T17 are turned OFF and the motor M and the plunger PL2 are made inoperative. Consequently, the tape is kept in its stopped condition when the tape end terminal is sensed. If, thereafter, the automobile driver, on getting into the car, inserts his key into and turns on the ignition switch S12 and, if the abnormal condition is left unsettled, the transistor T11 is connected at its base terminal to the electric source so that it turns ON. The transistor T12 connected in series thereto is also turned ON. Consequently, the differential circuit 9 is operated to produce a trigger signal and thereby the FF circuit 10 is switched.

The transistors T14 and T15 are turned ON and, consequently, in almost the same manner as described above, all the circuits are operated and the playback of the same channel is effected again from its beginning. Thereby, the driver is reminded that, after pushing of the stop switch S15, he has forgotten to remedy the abnormal condition. Thus the proper measures can now be taken.

Thus, according to the invention, the driver can be warned of an improper vehicle condition by a colloquial speech recording and, by providing the warning stop means and the warning stop release means operable by closing of the ignition switch, it is prevented that the driver is forced to hear the warning, repeatedly and additionally. If he has not taken any measures after stopping the warning, the warning can be given again from its beginning when he inserts the engine key so that the vehicle will always be put in a stable driving condition resulting from an appropriate warning.

What is claimed is:

1. An acoustic warning apparatus adapted for giving audible warnings corresponding respectively to abnormal conditions which may taken place in a vehicle, said apparatus comprising detecting means for independently detecting each of said abnormal conditions when they occur, a record means having recorded thereon a plurality of signals corresponding to said warnings, said signals being adapted for being read as respective audible warnings, transducer and driving means for reading one of said signals at a time, control circuit means responsive to said detector means for selecting the appropriate signal to be read and for actuating said transducer and driving means, warning stop means for interrupting the reading of a signal, warning stop release means for overriding said warning stop means and enabling a signal to be read, said warning stop release means including an ignition switch for said vehicle and a circuit operated by said switch to enable the reading of the latter said signal, said transducer and driving means including an amplifier means for amplifying the signal which is read and a motor circuit means for driving the record means, said warning stop means including a switch coupled to said amplifier means for deactivating the same, said motor circuit means being independent of the warning stop means to drive the record means through a cycle so that it is prepared to operate anew upon the next operation of the detecting means, said record means including a magnetic tape, said transducer and driving means including a magnetic head for scanning said tape and moving means for incrementally moving the head transversely of said tape, said control circuit means including an oscillator means and first transistor means coupling the oscillator means selectively to said moving means.

2. Apparatus as claimed in claim 1 comprising means for recording a further signal on said tape.

3. Apparatus as claimed in claim 1 wherein the tape has recorded thereon measures for correcting the abnormal conditions.

4. Apparatus as claimed in claim 1 wherein said detecting means includes a plurality of sensing switches and said control circuit means includes a multiple contact switch mechanically coupled to said moving means, second transistor means coupled to said oscillator to actuate the same, the contacts of said multiple contact switch being coupled in parallel to said sensing switches, and a third transistor means coupled to said multiple contact switch and to said second transistor means, said second transistor means actuating said oscillator means when one of the sensing switches is actuated and until the multiple contact switch is adjusted by the moving means to the contact corresponding to the actuated sensing switch at which time the third transistor means deactivates the second transistor means and stops the moving means.

5. Apparatus as claimed in claim 4 wherein the control circuit means includes a flip flop and a fourth transistor means coupling said multiple contact switch to said flip flop whereby the flip flop is operated by the latter, said flip flop being coupled to and controlling said motor circuit means.

6. Apparatus as claimed in claim 5 comprising capstan means for engaging and driving said tape and coupled to and controlled by said flip flop.

7. Apparatus as claimed in claim 6 wherein said motor circuit means includes timing circuit means to drive the motor circuit means for a predetermined period of time.

8. Apparatus as claimed in claim 7 comprising a plurality diodes coupling said sensing switches to said second transistor means.

9. Apparatus as claimed in claim 4 wherein the tape has recorded thereon measures for correcting the abnormal conditions.

* * * * *